United States Patent
Bergstrom et al.

(10) Patent No.: US 10,126,837 B1
(45) Date of Patent: Nov. 13, 2018

(54) WEARABLE DEVICE THAT IS AUTOMATICALLY CONFIGURABLE BETWEEN WEARER FACING AND REDEMPTION INTERFACES

(71) Applicant: Groupon, Inc., Chicago, IL (US)

(72) Inventors: Peter Bengt Karl Bergstrom, Mountain View, CA (US); Adam John Muhlbauer, Mountain View, CA (US); Don Albert Chennavasin, Los Gatos, CA (US); Devdatta Gangal, Mountain View, CA (US); Jingting Wang, Palo Alto, CA (US)

(73) Assignee: GROUPON, INC., Chicago, IL (US)

( * ) Notice: Subject to any disclaimer, the term of this patent is extended or adjusted under 35 U.S.C. 154(b) by 0 days.

(21) Appl. No.: 15/197,202

(22) Filed: Jun. 29, 2016

Related U.S. Application Data

(60) Provisional application No. 62/186,300, filed on Jun. 29, 2015.

(51) Int. Cl.
| | |
|---|---|
| *G06F 3/0346* | (2013.01) |
| *G06F 1/16* | (2006.01) |
| *G06Q 30/02* | (2012.01) |
| *G06F 3/0488* | (2013.01) |

(52) U.S. Cl.
CPC ............ *G06F 3/0346* (2013.01); *G06F 1/163* (2013.01); *G06Q 30/0238* (2013.01); *G06F 3/04883* (2013.01)

(58) Field of Classification Search
None
See application file for complete search history.

(56) References Cited

U.S. PATENT DOCUMENTS

| | | | |
|---|---|---|---|
| 8,355,948 B2 | 1/2013 | Mason | |
| 2005/0212911 A1* | 9/2005 | Marvit | G06F 3/017 348/154 |
| 2015/0092520 A1* | 4/2015 | Robison | G04G 21/02 368/9 |

OTHER PUBLICATIONS

U.S. Appl. No. 13/411,502, filed Mar. 2, 2012.
U.S. Appl. No. 13/829,581, filed Mar. 14, 2013.

* cited by examiner

*Primary Examiner* — Gustavo Polo
(74) *Attorney, Agent, or Firm* — Alston & Bird LLP

(57) ABSTRACT

Provided herein are method, apparatus, and computer program products for automatically outputting a wearer interface or a redemption interface. The wearer interface and the redemption interface may contain information related to a wearer of a wearable device and a provider respectively. The wearable device may reference a merchant redemption parameters database to facilitate the output of the redemption interface, and the wearable device my reference a wearer parameters database to facilitate the output of the wearer interface. Both the wearer interface and the redemption interface may be displayed on the wearable device by an interactive display.

36 Claims, 13 Drawing Sheets

WEARABLE DEVICE THAT IS AUTOMATICALLY CONFIGURABLE BETWEEN WEARER FACING AND REDEMPTION INTERFACES

CROSS-REFERENCE TO RELATED APPLICATIONS

This application claims the benefit of U.S. Provisional Patent Application No. 62/186,300, titled "Wearable Device That Is Automatically Configurable Between Wearer Facing And Redemption Interfaces," filed Jun. 29, 2015, which is incorporated by reference herein in its entirety.

BACKGROUND OF THE INVENTION

A promotion and marketing service may offer promotions related to goods and/or services (i.e., items) to consumers and consumers may redeem promotions with the provider of such items. Applicant has identified a number of deficiencies and problems associated with conventional redemption processes and associated devices. Through applied effort, ingenuity, and innovation, many of these identified problems have been solved by developing solutions that are included in embodiments of the present invention, many examples of which are described in detail herein.

BRIEF SUMMARY

In general, embodiments of the present invention provided herein include methods, apparatus, and computer program products for a wearable device that is automatically configurable between wearer facing and redemption interfaces based on movement or manipulation of the wearable device between wearer facing and redemption positions.

In some embodiments, a wearable device comprises at least a processor and a memory associated with the processor having computer coded instructions therein. The wearable device further comprises an interactive display and an orientation module coupled with the processor. The orientation module is configured to determine whether the wearable device is oriented in the wearer facing position or the redemption position. The wearable device also includes an adaptation module that is configured to: output a wearer interface to the interactive display when the orientation module determines the wearable device is oriented in the wearer facing position, and output a redemption interface to the interactive display when the orientation module determines the wearable device is oriented in the redemption position.

In some embodiments, the wearer interface may comprise a wearer component and the redemption interface comprises a redemption component.

In some embodiments, the redemption component may be rendered by the interactive display as at least one of a quick response code, a barcode, or an alphanumeric code.

In some embodiments, the adaptation module may be configured to determine a location associated with the wearable device, and the adaptation module may be further configured to cause the interactive display to render the at least one quick response code, barcode, or alphanumeric code based on the determined location associated with the wearable device. The adaptation module may be further configured to access a merchant redemption parameters database prior to rendering the redemption component.

In some embodiments, the adaptation module may be configured to determine the wearer component upon accessing wearer information stored to a wearer parameters database.

In some embodiments, the wearer component may be represented by personally identifiable information. The wearer component may also comprise transaction data, alternate application data, and the like.

In some embodiments, the wearable device may be configured to receive accelerometer data, camera data, audio data, and/or neural network model data associated with the wearable device. The orientation module may be further configured to determine whether the wearable device is oriented in the wearer facing position or the redemption position based the accelerometer data, camera data, audio data and/or neural network model data.

In some embodiments, a method is provided for presenting one or more interfaces on a wearable device. The method may comprise of determining, by a processor, whether the wearable device is oriented in a wearer facing position or a redemption position. Outputting using an adaptation module coupled to the processor, a wearer interface to an interactive display when the processor determines the wearable device is oriented in the wearer facing position. Outputting using the adaptation module, a redemption interface to the interactive display when the processor determined the wearable device is positioned in the redemption position. Presenting, using the interactive display, the wearer interface or the redemption interface.

In some embodiments, the wearer interface may comprise a wearer component and the redemption interface comprises a redemption component.

In some embodiments, the method may further comprise rendering, using the interactive display, the redemption component as a quick response code, barcode, or an alphanumeric code.

In some embodiments, the method may further comprise determining, using the adaptation module, a location associated with the wearable device. Rendering, using the interactive display, the redemption component based on the determined location associated with the wearable device.

In some embodiments, the method may further comprise accessing, using the adaptation module, a merchant redemption parameters database prior to rendering the redemption component.

In some embodiments, the method may further comprise accessing, using the adaptation module a wearer parameters database. Determining, using the adaptation module, the wearer component from information stored on the wearer parameters database.

In some embodiments, the wearer component may represent personally identifiable information.

In some embodiments, the wearer component may comprise transaction data and/or alternate application data.

In some embodiments, the method may further comprise receiving, using the orientation module, camera data, audio data, neural network model data, and/or accelerometer data associated with the wearable device. Determining, using the orientation module, whether the wearable device is oriented in the wearer facing position or the redemption position based on the accelerometer data, camera data, audio data and/or neural network model data.

In some embodiments, a computer program may be provided comprising of non-transitory computer readable storage medium and computer program instructions stored therein. The computer program instructions may be configured to determine, using an orientation module, the orientation of a wearable device. Determine, using the orientation module, the wearable device is oriented in a wearer facing position or a redemption position. Output, using an adaptation module, a wearer interface to an interactive display when the orientation module determines the wearable device is oriented in the wearer facing position. Render, using the interactive display, the wearer interface, and output, using the adaptation module, a redemption interface to the interactive display when the orientation module determines the wearable device is oriented in the redemption position.

In some embodiments, the wearer interface may comprise a wearer component and the redemption interface comprises a redemption component.

In some embodiments, the computer program product may be further configured to render, using the interactive display, the redemption component as a quick response code, barcode, or an alphanumeric code.

In some embodiments, the computer program product may be further configured to determine, using the adaptation module, a location associated with the wearable device. Rendering, using the interactive display, the redemption component based on the determined location associated with the wearable device.

In some embodiments, the computer program product may be further configured to access, using the adaptation module, a merchant redemption parameters database prior to rendering the redemption component.

In some embodiments, the computer program product may be further configured to access, using the adaptation module a wearer parameters database. Determining, using the adaptation module, the wearer component from information stored on the wearer parameters database.

In some embodiments, the wearer component may represent personally identifiable information.

In some embodiments, the wearer component may comprise transaction data and/or alternate application data.

In some embodiments, the computer program product may be further configured to receive, using the orientation module, camera data, audio data, neural network model data, and/or accelerometer data associated with the wearable device. Determine, using the orientation module, whether the wearable device is oriented in the wearer facing position or the redemption position based on the accelerometer data, camera data, audio data and/or neural network model data.

BRIEF DESCRIPTION OF DRAWINGS

Reference will now be made to the accompanying drawings, which are not necessarily drawn to scale, and wherein.

DETAILED DESCRIPTION OF THE DRAWINGS

Figure 1:
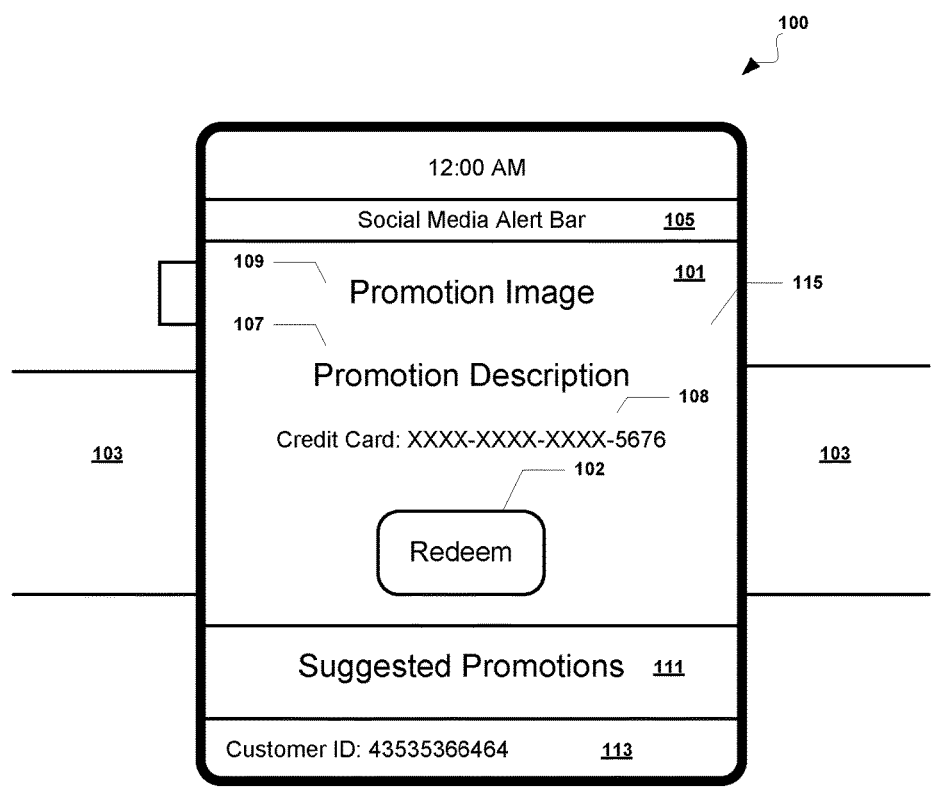
FIG. 1 illustrates an example of an interactive display of a wearable device outputting a wearer interface and oriented in a wearer facing position.

Some embodiments of the present invention will now be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Terms

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and is operable to provide example promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "provider" may include, but is not limited to, a merchant, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. For example, a provider may be in the form of a running company that sells apparel or other goods and services that are generally used by a person who runs or participates in athletic activities.

As used herein, the term "consumer" may include, but is not limited to, a client, customer, purchaser, shopper, user, or the like, who may be in the position to or does exchange value for one or more vouchers under the terms defined by one or promotions. For example, and using the aforementioned running company as the example provider, a consumer may be an individual who is interested in purchasing running shoes.

As used herein, the term "wearer" may include, but is not limited to anyone who has a wearable electronic device attached to their person. For example, a wearer may be a person who is wearing a smart watch.

As used herein, the term "promotion" may include, but is not limited to, any type of offered, presented or otherwise indicated reward, discount, coupon, credit, deal, incentive, discount, media or the like that is indicative of a provider value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a provider value (e.g., the value of the resultant instrument beyond the accepted value), a residual value (e.g., the value upon return or upon expiry of one or more redemption parameters), one or more redemptions parameters and/or the like. Using the running company promotion as an example, the accepted value is $25 and the provider value is $50. In this example, the residual value may be equal to the accepted value.

As used herein, the term "item" refers to any product, good, promotion, service, option, or other tangible or intangible thing that may be displayed in a user interface.

As used herein, the term "feature" refers to the size, shape, color, text, highlighting, shading, opacity, image overlay, or any other discernible attribute of a tangible or intangible visualization of an item.

As used herein, the term "item data" refers to any data related to an item, such as, but not limited to, transaction data, environmental data, item characteristic data, business data, and any other data that may serve to distinguish one or more items from each other.

As used herein, the term "profile identifier" refers to any data that identifies a user, consumer, provider, provider employee, or promotion and marketing service. For example, and without limitation, a profile identifier may include a unique identifier, an IP address, a MAC address, a merchant identifier, a customer identifier, and the like.

As used herein, the term "profile data" refers to any data associated with a profile identifier, such as, but not limited to, transaction data, biographical data, preference data, or any other data that may serve to distinguish one or more profiles from each other.

As used herein, the term "transaction data" refers to any item or profile data related to the buying, selling, or offering of an item, such as, but not limited to, sales data including historical and predicted revenue for each item, historical and predicted profits for each item, quantities sold for each item, quantity of customers purchasing each item, overall selection rate of each item, popularity of an item, or a selection rate per transaction or per customer of each item. Transaction data may also include redemption data, in the case of a promotion that must be redeemed, or may include return data for an item or promotion that is returned. In some embodiments, transaction data may include a consumer rating of an item. The transaction data may also include transactions with respect to profile information, such as transactions involving a single profile or related group of profiles.

As used herein, the term "environmental data" refers to contextual or environmental information associated with an item and/or associated with transactions involving items such as, without limitation, a time of day, time of year, weather, season, geographic or hyper-geographic location, or any other data that gives context to an item and/or to a transaction.

As used herein, the term "business data" refers to commercial or strategic data associated with an item that may define metrics for a provider or promotion and marketing service. For example and without limitation, goal data, such as sales goals, impression goals, redemption goals, revenue goals, profit goals or inventory data may serve as business data.

As used herein, the terms "characteristic data" and "characteristic information" refers to any identifying attributes of an item that may serve to distinguish the item from other items, such as, but not limited to, physical characteristics (e.g. color, texture, flavor, crunchiness, etc.) and/or health characteristics (e.g. vitamin and nutrient content).

As used herein, the term "biographical data" refers to information associated with a person(s) (e.g., consumer, wearer, provider, provider employee, etc.) identified in a profile, such as, for example, birth dates, allergies, socio-economic data, interests, place of residence, login credential information, and/or any other identifying information about a profile.

As used herein, the term "preference data" refers to one or more options associated with a profile, such that the preference data tracks the profile holder's interests and selections for various user-selectable interface options. Preference data may also include, without limitation, location data (e.g., GPS data, operating system location, etc.) associated with activity of a user associated with a profile.

As used herein, the term "wearer facing position" refers to an orientation of a wearable device such that the interactive display of the wearable device is directed towards the wearer.

As used herein, the term "redemption position" refers to an orientation of a wearable device such that the interactive display of the wearable device is directed toward a third party (e.g., a provider and/or point of sale device or system).

As used herein, the term "non-interactive position" refers to an orientation of a wearable device such that the interactive display of the wearable device is not directed for viewing by the wearer or by any third party. For example, when a wearable device is embodied as a watch, a non-interactive position may be the wearer is standing with their arms at their side in a neutral position.

As used herein, the term "wearer interface" refers to a graphic user interface configured specifically for viewing by the wearer of the wearable device.

As used herein, the term "redemption interface" refers a graphic user interface configured specifically to facilitate redemption of a promotion by a provider (e.g., a merchant).

As used herein, the term "non-active interface" refers to a graphic user interface configured to facilitate low power consumption and/or user and data privacy.

As used herein, the term "redemption component" refers to features, portions, buttons, widgets, macros, dashboards, or other parts of the redemption interface that may relate to or facilitate the redemption of a promotion. For example, a redemption component may be a redemption code (e.g. quick response code (QR code), barcode, alphanumeric code, a unique identifier), provider identifier, promotion notes/description, identification of products in stock at the provider, and the like.

As used herein, the term "wearer component" refers to features, portions, buttons, widgets, macros, dashboards, or other parts of the wearer interface that may relate to the wearer, any promotion including yet to be redeemed promotions and previously purchased promotions, suggested promotions, and the like. For example, a wearer component may be a consumer identification number, account information, payment information including personally identifiable information, social media information, suggested promotional information, and the like.

As used herein the term "alternate application data" refers to data generated from applications operating on the wearable device or associated devices that contain personal information. For example, alternate application data may be a text message from the wearer's spouse, a Facebook™ message and/or alert, an electronic notification from a third party application, an e-mail message and/or alert, and the like.

As used herein the term "interactive display" refers to any display capable of allowing input through user interaction. For example, an interactive display may be a touch screen.

Wearable Device

FIG. 1 is an illustrative embodiment of wearable device 100 oriented in a wearer facing position. The wearable device 100 may be any network connected device that is capable of being attached to a wearer's body that may be manipulated between at least a wearer facing position and a redemption position (e.g., a third party facing position). In some embodiments, wearable device 100 may include attachment mechanism 103 (e.g., a wrist band, strap, or similar means) structured to allow the wearable device to be attached to the wearer's body (e.g., a wrist, hand, or arm, etc.) as shown. The illustrated wearable device 100 is a smart watch such as the Apple Watch by Apple, Inc., or the Samsung Gear™ Live watch by Samsung Corporation.

The depicted wearable device 100 includes interactive display 101. Interactive display 101 may be implemented by a touch screen or any other device that is configured to display information and to allow and facilitate user interaction with the wearable device. Interactive display 101 may encompass all or part of wearable device 100.

Figure 2:
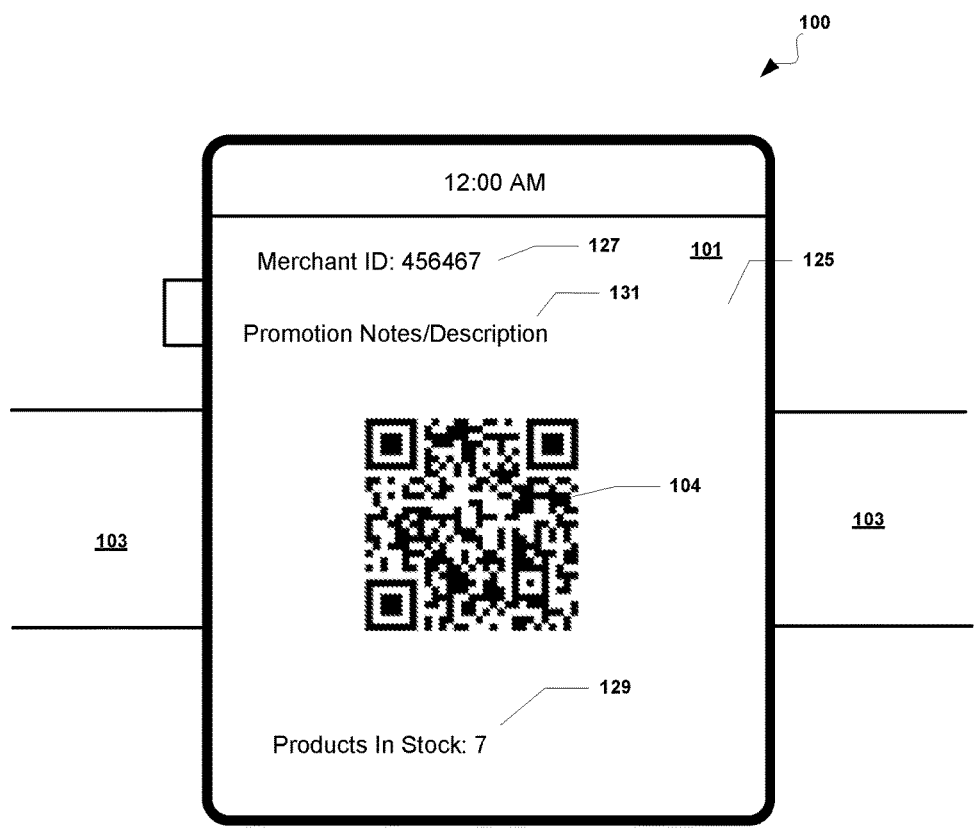
FIG. 2 illustrates an example of an interactive display of wearable device outputting a redemption interface and oriented in a redemption position.

In some embodiments, as discussed in detail below, the depicted wearable device 100 is configured to display, via interactive display 101, different interfaces (i.e., display rendered graphic user interfaces) based on the orientation of the wearable device 100. For example, in various embodiments, the wearable device 100 includes an adaptation module (discussed in detail below) that is configured to output a wearer interface to the interactive display 101 (as shown in FIG. 1) when the wearable device is oriented in a wearer facing position and further configured to output a redemption interface to the interactive display 101 (as shown in FIG. 2) when the wearable device is oriented in a redemption position.

In the wearer facing position, the interactive display 101 of the depicted wearable device 100 is configured to render a wearer interface 115 as shown. In the depicted embodiment, the wearer interface 115 is a graphic user interface configured specifically for the wearer of the wearable device 100 and associated with the prior purchase by the wearer of a promotion. The wearer interface 115 may comprise a number of wearer components including, without limitation, a social media alert bar 105, a promotion image 109, a promotion description 107, transaction data 108, one or more suggested promotions 111, and a customer identifier 113. In some embodiments, there may be non-visual components of the wearer facing interface 115 including, without limitation, audio elements that may audibly output contents of social media alert bar 105, a promotion description 107, transaction data 108, suggested promotions 111, consumer identifier 113, and the like, voice elements that may allow activation of various elements of the wearer interface 115 via a voice command, and the like.

Notably, many (if not all) of the wearer components are intended for viewing (or hearing) only by the wearer. Some wearer components present a security risk if presented to third parties (e.g., transaction data 108, customer identifier 113, alternate application data, notifications, or alerts that may be presented via the social media alert bar 105, etc.) Other wearer components are specifically determined to be relevant to the wearer (e.g., suggested promotions 111) and thus may be of little interest to third parties.

The depicted wearer interface 115 includes a redemption button 102 (e.g., a soft key or button rendered by the graphic user interface) that may be engaged by the wearer to indicate an intent to redeem a previously purchased promotion. In other embodiments, as discussed below, a redemption button 102 may be omitted and unnecessary as the wearer indicates an intent to redeem a previously purchased promotion simply by moving the wearable device into the redemption position. In some embodiments, the wearer may redeem a previously purchased promotion using certain gestures. For example, the wearer may rotate his wrist from the wearer facing position to the redemption position to redeem the promotion.

In some embodiments, the wearable device 100 may be configured to be worn by multiple wearers. For example, the interactive display 101 may be configured to present an authentication screen to the wearer to allow the wearer to log into an application run by the wearable device 100. After authentication, the wearable device 100 may load settings, profile information, purchase history information, transaction data, and the like in order to render a wearer-tailored wearer interface 115 and associated wearer components.

FIG. 2A depicts a wearable device 100 orientated in a redemption position. In the redemption position, the interactive display 101 of the wearable device 100 is configured to present a redemption interface 125 as shown. In the depicted embodiment, the redemption interface 125 is a graphic user interface configured specifically to facilitate redemption of a promotion by a provider (e.g., a merchant). The redemption interface 125 may comprise a number of redemption components including, without limitation, a provider identifier 127, provider account information (not shown), promotion notes/description 131, a redemption code (e.g. a quick response code (QR Code), barcode, and alphanumeric code) 104, inventory data 129, and the like. In other embodiments, there may be non-visual components of the redemption interface 125 including, without limitation, audio elements that may audibly output provider identifier 127, provider account information, promotion notes/description 131, a redemption code 104, inventory 129, and the like, voice elements that may allow activation of a redemption code 104 via a voice command, and the like. Notably, many (if not all) of the redemption components are intended for viewing (or hearing) only by the provider. Some redemption components present a security risk if presented to third parties (e.g., provider identifier 127, redemption code 104, transaction information, etc.). Other redemption components are specifically determined to be relevant to the provider (e.g., promotion notes/descriptions 131, inventory data 129) and thus may be of little interest to the wearer or third parties.

The redemption code 104 corresponds to a promotion previously purchased from a promotional and marking service or provider. A provider may redeem a promotion by interacting with (e.g., touching or scanning) the redemption code 104 rendered by the interactive display 101. For example, the wearer of the wearable device 100 purchases a $40 gift card promotion. This gift card is rendered on the interactive display 101 as a redemption code. To redeem the promotion, the wearer orients the wearable device 100 into the redemption position and the provider scans the redemption code.

FIGS. 3A-3D depict the wearable device 100 oriented in several different positions. In various embodiments, the wearable device 100 includes an orientation module (see FIGS. 8-11) that is configured to output a determination of the position of the wearable device 100 using various data (e.g., accelerometer data, gyroscope data, audio data, camera data). The wearer may freely manipulate the wearable device 100 between a wearer facing position (shown in FIG. 3A), a non-interactive position (shown in FIG. 3B), and a redemption position (shown in FIG. 3C and FIG. 3D).

Figure 3A:
FIG. 3A illustrates an example of the wearable device oriented in a wearer facing position.
Figure 3B:
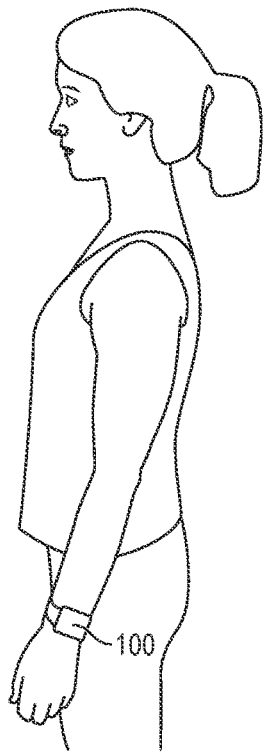
FIG. 3B illustrates an example of a wearable device orientated in a non-interactive position.

In FIG. 3A, the wearer facing position is depicted as the wearable device 100 being oriented in front of the wearer such that the interactive display of the wearable device 100 is viewable by the wearer. In FIG. 3B, the non-interactive position is depicted the wearable device 100 being oriented at the side of the wearer such that the interactive display of wearable device 100 is not intended for viewing by any party. When the orientation module of the wearable device 100 indicates the non-interactive position, the processor wearable device 100 may put the wearable device into a sleep mode, a watch mode (e.g. where a digital clock is displayed), or a power power mode to conserve battery power and protect the privacy of the user.

Figure 3C:
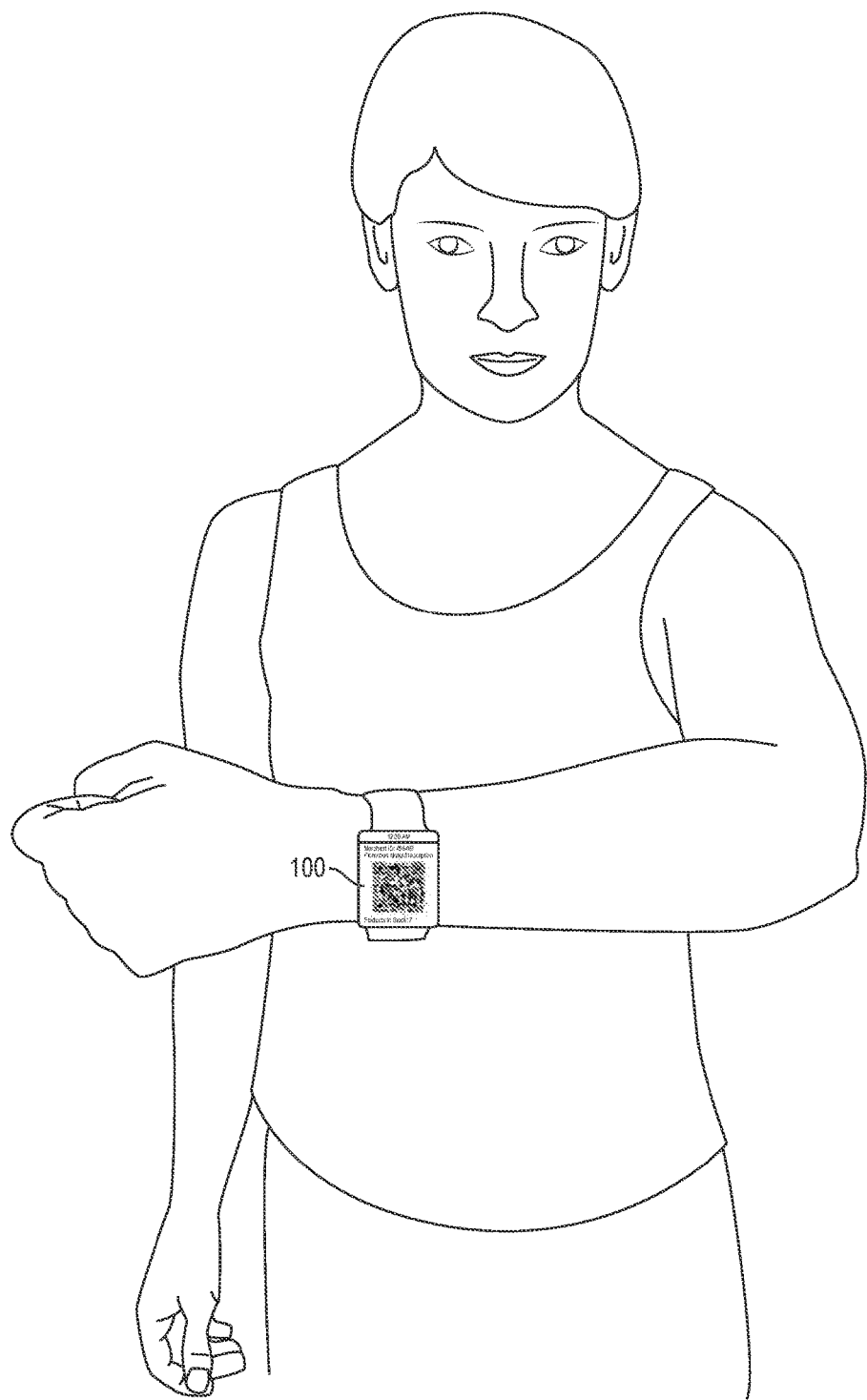
FIG. 3C illustrates an example of a wearable device orientated in a redemption position.
Figure 3D:
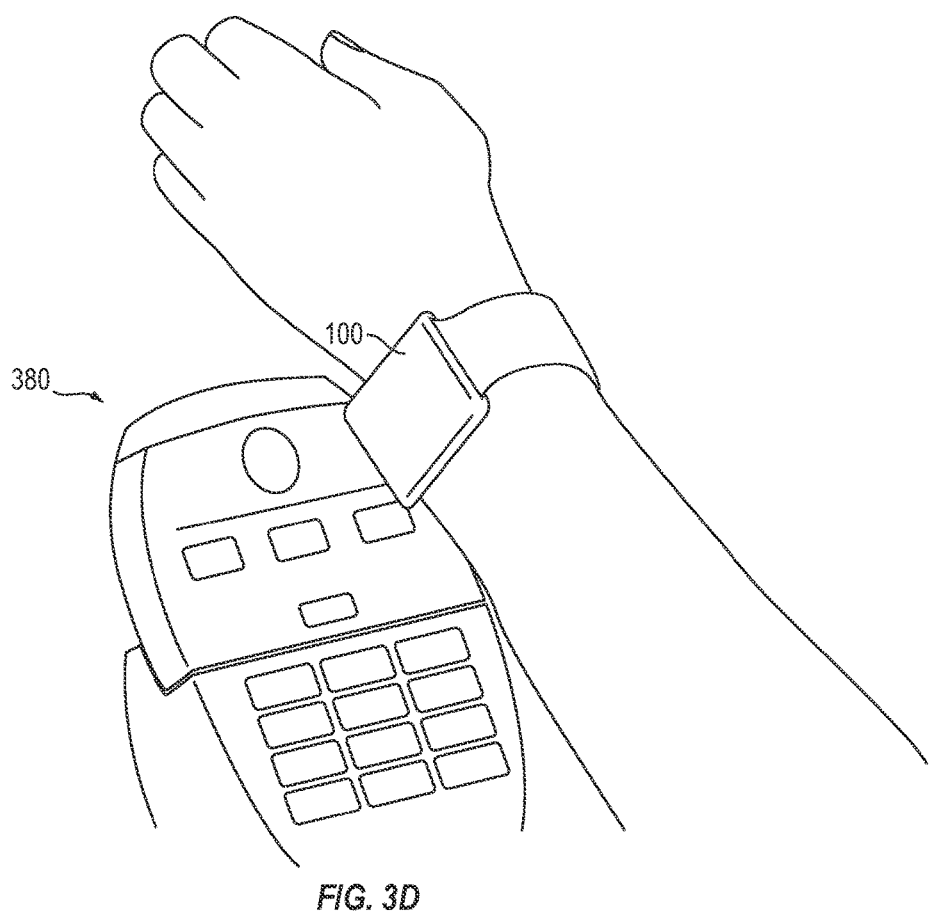
FIG. 3D illustrates another example of a wearable device oriented in a redemption position.

In FIG. 3C, the redemption position is depicted as the wearable device 100 being oriented away from the wearer such that the interactive display of the wearable device 100 is viewable by a provider (e.g., a provider or a point of same terminal of a provider). In FIG. 3D, another redemption position is depicted as the wearable device 100 being oriented toward the point of sale device 380 such that the interactive display of the wearable device 100 interacts with (e.g., is scanned or read by) the point of sale device 380 (e.g., a barcode scanner, Bluetooth reader, etc.). The point of sale device 380 may be any device that is capable of reading information from the interactive display of the wearable device 100 (e.g. quick response codes, barcodes, alphanumeric codes, merchant information, and the like). For example, the point of sale device 380 may be a tablet, a computer, or the like. Although FIGS. 3A-3D only depict a wearer facing position, a non-interactive position, and a redemption position it is within scope of the invention described herein to orient the wearable device 100 in an unlimited number of positions.

Network Environment

Figure 4A:
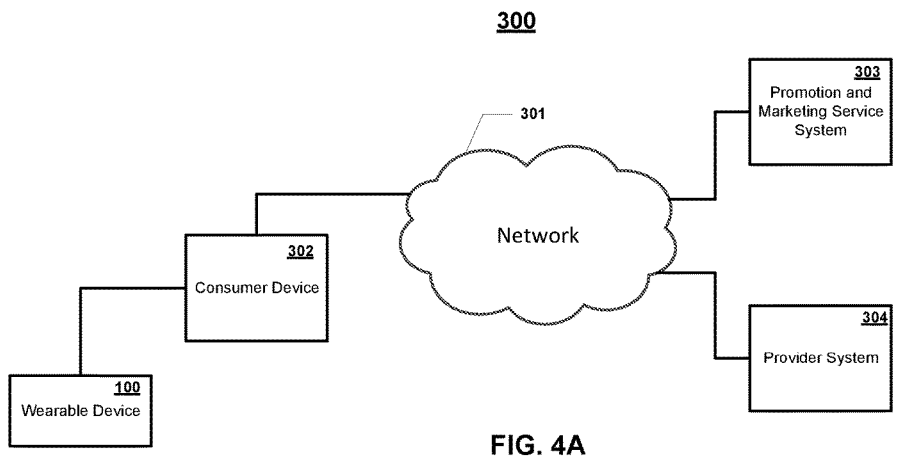
FIG. 4A illustrates an example system structured in accordance with some embodiments discussed herein.

FIG. 4A illustrates system 300 including an example network architecture for a system, which may include one or more devices and sub-systems that are configured to implement some embodiments discussed herein. For example, system 300 may include provider system 304, which may include, for example, the circuits disclosed in FIGS. 5-6, a provider server, or a provider database, among other things (not shown). The provider system 304 may include any suitable network server and/or other type of processing device. In one embodiment, the provider system 304 may determine and transmit commands and instructions relating to the use of wearable device 100, the purchase of promotions, and/or the redemption of promotions to consumer device 302, promotion and marketing service system 303, and/or wearable device 100.

Provider system 304 may communicate with the consumer device 302, wearable device 100, and/or promotion and marketing service system 303 using network 301. Network 301 may include any wired or wireless communication network including a wired or wireless local area network (LAN), personal area network (PAN), metropolitan area network (MAN), wide area network (WAN), or the like, as well as any hardware, software and/or firmware required to implement it (e.g. network routers and network switches). For example, network 301 may include a cellular telephone, an 802.11, 802.16, 802.20 and/or WiMax network. Further, network 301 may include a public network, such as the Internet, a private network, such as an intranet, or combinations thereof, and may utilize a variety of networking protocols now available or later developed including, but not limited to TCP/IP based networking protocols.

Consumer device 302 may be implemented as a personal computer and/or networked device, such as a cellular phone, tablet computer, mobile device, point of sale terminal, inventory management terminal etc., which may be used to aid and/or communicate with wearable device 100. Although only one consumer device is depicted in FIG. 4A it is within the scope of this invention, in some embodiments, to include multiple consumer devices. In some embodiments, wearable device 100 may have a minimal amount of processing hardware and cannot perform large processing tasks, and consumer device 302 may act as wearable device's 100 processing hub and facilitate communications between wearable device 100 and network 301. In such embodiments, wearable device 100 may be coupled to consumer device 302 by any suitable wireless or wired communication network, including, for example, a universal serial bus connection (USB), LAN, PAN, or the like, as well as any hardware, software (e.g., protocols) and/or firmware required to implement it. For example, wearable device 100 may be connected to consumer device 302 using an infrared, Bluetooth, wireless USB, Zigbee connection, and the like.

Figure 4B:
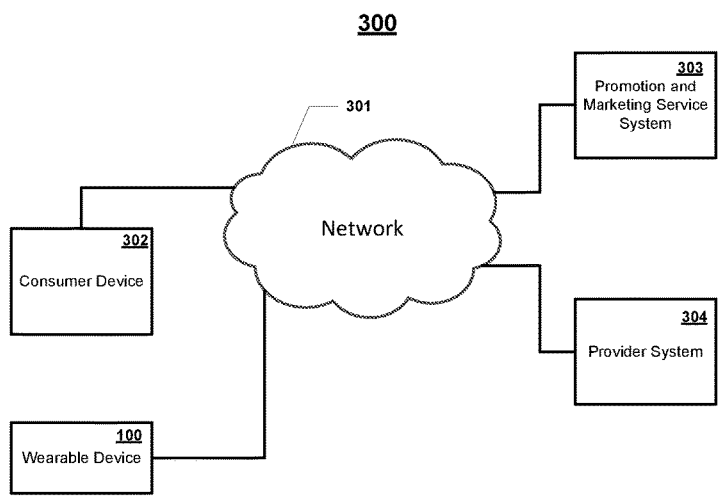
FIG. 4B illustrates an alternate example system structured in accordance with some embodiments discussed herein.

In other embodiments, as illustrated in FIG. 4B wearable device 100 may have sufficient processing hardware to perform processing tasks and will not use consumer device 302 for processing support and/or communication support. In such an embodiment, wearable device 100 may connect directly to network 301, but may still connect to consumer device 302 for other functions (e.g., accelerometer, gyroscope, and camera functionality of consumer device 302).

Promotion and marketing service system 303 may be implemented separately or included in provider system 304. Promotion and marketing server system 303 may communicate with consumer device 302, wearable device 100 and/or provider system 304 using network 301. Promotion and marketing system 303 may determine and transmit commands and instructions related to promotions and/or redemption of promotions to consumer device 302, provider system 304 and/or wearable device 100.

Figure 5:
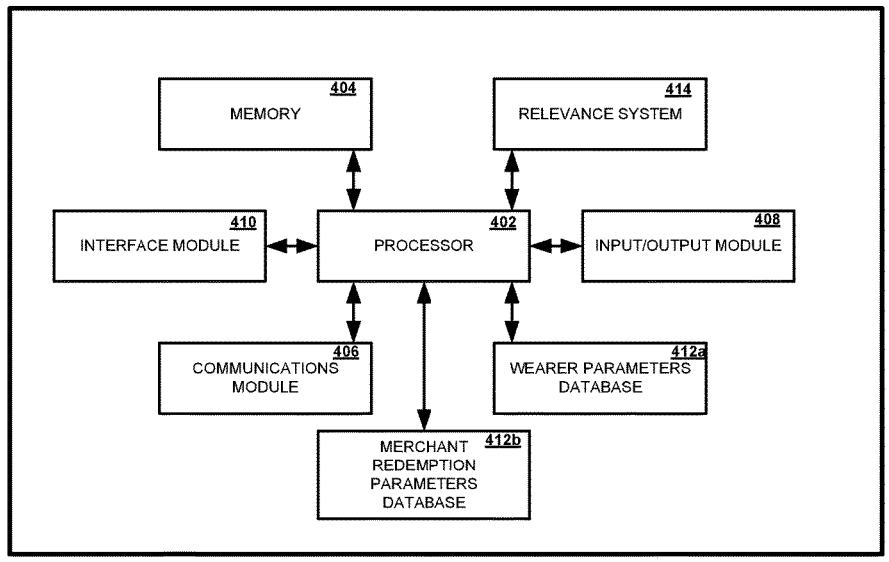
FIG. 5 illustrates a schematic block diagram of circuitry that can be included in a computing device, such as a wearable device, provider system, and/or promotion and marketing service system, in accordance with some embodiments discussed herein.

FIG. 5 shows a schematic block diagram of circuitry 400, some of or all of which may be included in, for example, provider system 304, promotion and marketing system 303, consumer device 302, point of sale device 380, and/or wearable device 100. Any of the aforementioned systems or devices may include circuitry 400 and may be configured to, either independently or jointly with other devices in network 301 perform the functions of the circuitry 400 described herein. As illustrated in FIG. 5, in accordance with some example embodiments, circuitry 400 can include various means such as processor 402, memory 404, communications module 406, and/or input/out module 408. In some embodiments, interface module 410 and/or relevance system 14 may also or instead be included.

As referred to herein, "module" includes hardware, software, and/or firmware configured to perform one or more particular functions. In this regard, the means of circuitry 400 may be embodied as hardware elements (e.g., a suitable programmed processor, combinational logic circuit, and/or the like), a computer program product comprising computer-readable program instructions stored on a non-transitory computer readable medium (e.g., memory 404) that is executable by a suitably configured processing device (e.g. processor 402), or some combination thereof.

Processor 402 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 5 as a single processor, in some embodiments processor 402 comprises a plurality of processors. The plurality of processors may be embodied on a single computing device or may be distributed across a plurality of computing devices collectively configured to function as circuitry 400. The plurality of processors may be in operative communication with each other and may be collectively configured to perform one or more functionalities of circuitry 400 as described herein. In an example embodiment, processor 402 is configured to execute instructions stored in memory 404 or otherwise accessible to processor 402. These instructions, when executed by processor 402, may cause circuitry 400 to perform one or more of the functionalities of circuitry 400 as described herein.

Whether configured by hardware, firmware/software methods, or by a combination thereof, processor 402 may comprise an entity capable of performing operations according to embodiments of the present invention while configured accordingly. Thus, for example, when processor 402 is embodied as an ASIC, FPGA or the like, processor 402 may comprise specifically configured hardware for conducting one or more operations described herein. Alternatively, as another example, when processor 402 is embodied as an executor of instructions, such as may be stored in memory 404, the instructions may specifically configure processor 402 to perform one or more algorithms and operations described herein, such as those discussed in connection with FIGS. 1-12.

Memory 404 may comprise, for example, volatile memory, non-volatile memory, or some combination thereof. Although illustrated in FIG. 5 as a single memory, memory 404 may comprise a plurality of memory components. The plurality of memory components may be embodied on a single computing device or distributed across a plurality of computing devices. In various embodiments, memory 404 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 404 may be configured to store information, data (including item data and/or profile data), applications, instructions, or the like for enabling circuitry 400 to carry out various functions in accordance with example embodiments of the present invention. For example, in at least some embodiments, memory 404 is configured to buffer input data for processing by processor 402. Additionally or alternatively, in at least some embodiments, memory 404 is configured to store program instructions for execution by processor 402. Memory 404 may store information in the form of static and/or dynamic information. This stored information may be stored and/or used by circuitry 400 during the course of performing its functionalities.

Communications module 406 may be embodied as any device or means embodied in circuitry, hardware, a computer program product comprising computer readable program instructions stored on a computer readable medium (e.g., memory 404) and executed by a processing device (e.g., processor 402), or a combination thereof that is configured to receive and/or transmit data from/to another device and/or network, such as, for example, a second circuitry 400 and/or the like. In some embodiments, communications module 406 (like other components discussed herein) can be at least partially embodied as or otherwise controlled by processor 402. In this regard, communications module 406 may be in communication with processor 402, such as via a bus. Communications module 406 may include, for example, an antenna, a transmitter, a receiver, a transceiver, network interface card and/or supporting hardware and/or firmware/software for enabling communications with another computing device. Communications module 406 may be configured to receive and/or transmit any data that may be stored by memory 404 using any protocol that may be used for communications between computing devices. Communications module 406 may additionally or alternatively be in communication with the memory 404, input/output module 408 and/or any other component of circuitry 400, such as via a bus.

Input/output module 408 may be in communication with processor 402 to receive an indication of a user input and/or to provide an audible, visual, mechanical, or other output to a user (e.g., provider and/or consumer). Some example visual outputs that may be provided to a user by circuitry 400 are discussed in connection with FIGS. 1-12. As such, input/output module 408 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 400 is embodied as a server or database, aspects of input/output module 408 may be reduced as compared to embodiments where circuitry 400 is implemented as an end-user machine (e.g., consumer device and/or wearable device) or other type of device designed for complex user interactions. In some embodiments (like other components discussed herein), input/output module 408 may even be eliminated from circuitry 400. Alternatively, such as in embodiments wherein circuitry 400 is embodied as a server or database, at least some aspects of input/output module 408 may be embodied on an apparatus used by a user that is in communication with circuitry 400. Input/output module 408 may be in communication with memory 404, communications module 406, and/or any other component(s), such as via a bus. One or more than one input/output module and/or other component can be included in circuitry 400.

Interface module 410 and relevance system 414 may also or instead be included and configured to perform the functionality discussed herein related to generating, arranging, presenting and/or editing wearer components, redemption components, wearer interfaces, redemption interfaces, item data, and/or profile data. In some embodiments, some or all of the functionality of generating, arranging, presenting and/or editing wearer components, redemption components, wearer interfaces, redemption interfaces, item data and/or profile data may be performed by processor 402 or interface module 410. In this regard, the example processor 402, interface module 410 and/or relevance system 414. For example, non-transitory computer readable media can be configured to store firmware, one or more application programs, and/or other software, which include instructions and other computer-readable program code portions that can be executed to control each processor (e.g., processor 402, interface module, and/or relevance system 414) of the components of system 400 to implement various operations, including the examples shown above. As such, a series of computer-readable program code portions are embodied in one or more computer program goods and can be used, with a computing device, server, and/or other programmable apparatus, to produce machine-implemented processes.

Figure 7A:
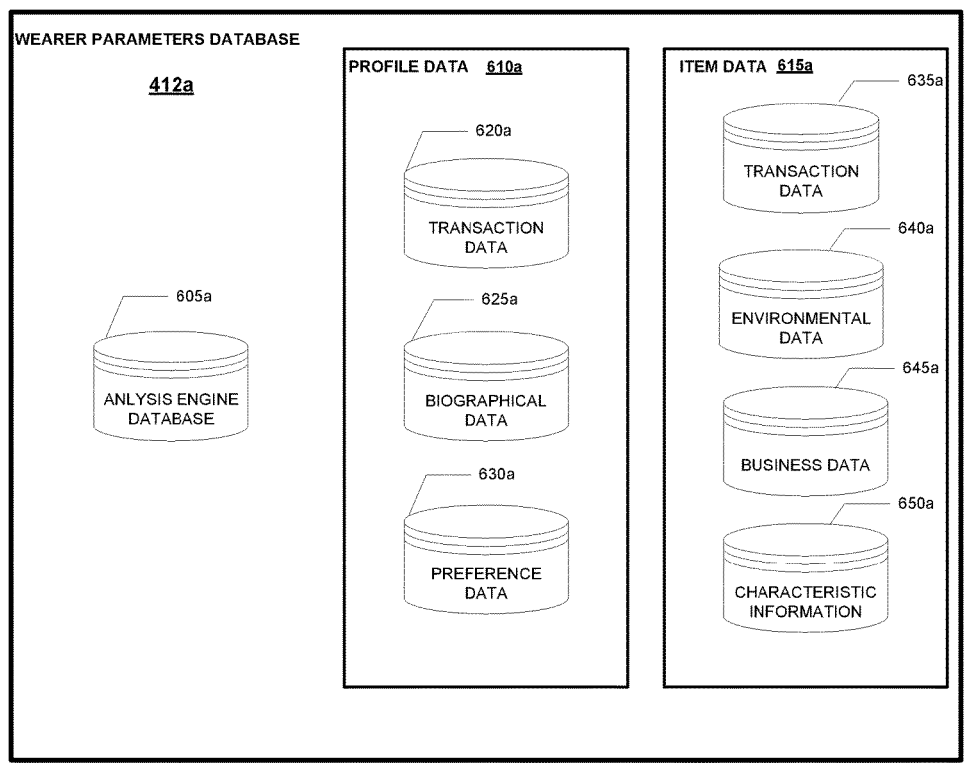
FIG. 7A illustrates an example wearer parameters database structured in accordance with some embodiments discussed herein.
Figure 7B:
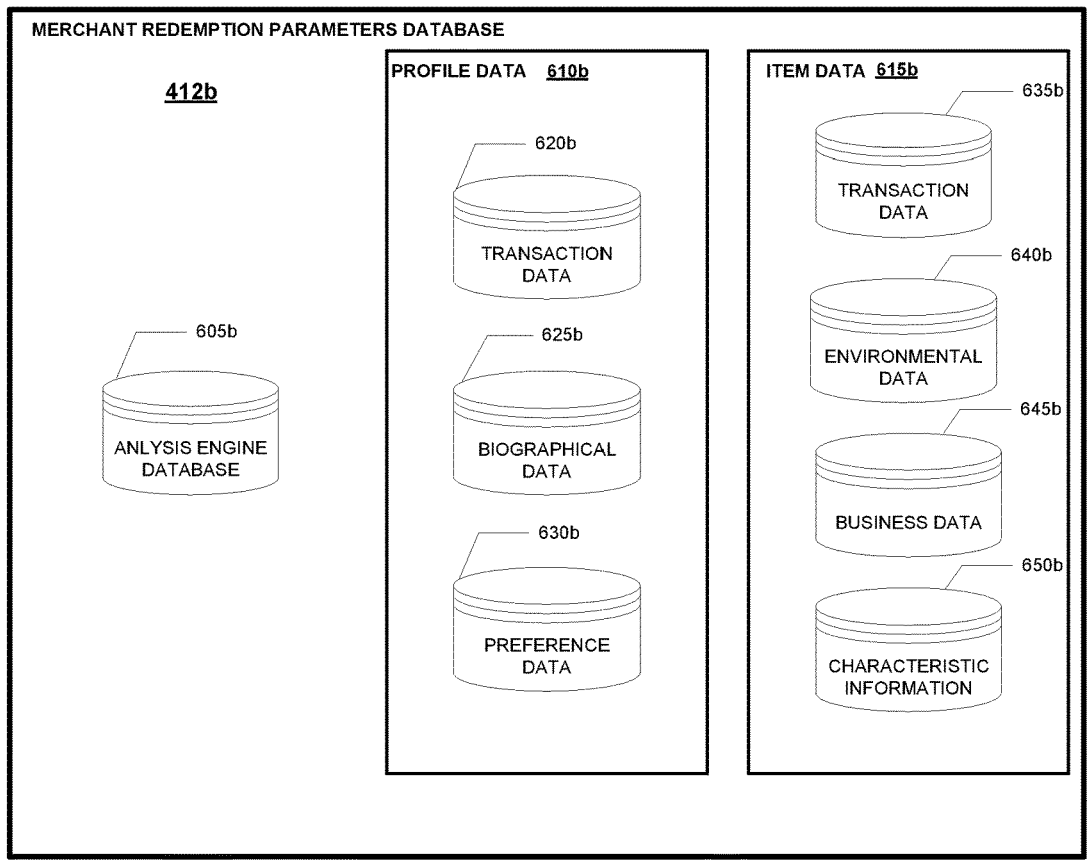
FIG. 7B illustrates an example merchant redemption parameters database structured in accordance with some embodiments discussed herein.

In some embodiments, a wearer parameters database 412a and a merchant redemption parameters database 412b may be provided that includes item data, profile data, and/or analytical engine data. Although shown as two separate databases the wearer parameters database 412a and the merchant redemption parameters database 412b may be implemented as one database. As shown in FIG. 7A, item data 615a may include transaction data 635a, environmental data 640a, business data 645a, and/or characteristic data 650a. Profile data 610a, in some embodiments, may include transaction data 620a, biographical data 625a, and/or preference data 630a. Additionally or alternatively, the wearer parameters database 412a may include analytical engine data 605a, which provides any additional information needed by the relevance system 414 and/or interface module 410 in wearer facing interface and the redemption interface of the wearable device 100. Although only the wearer parameters database 412a has been described identical structure is present in merchant redemption parameters database 412b as shown in FIG. 7B.

Figure 8:
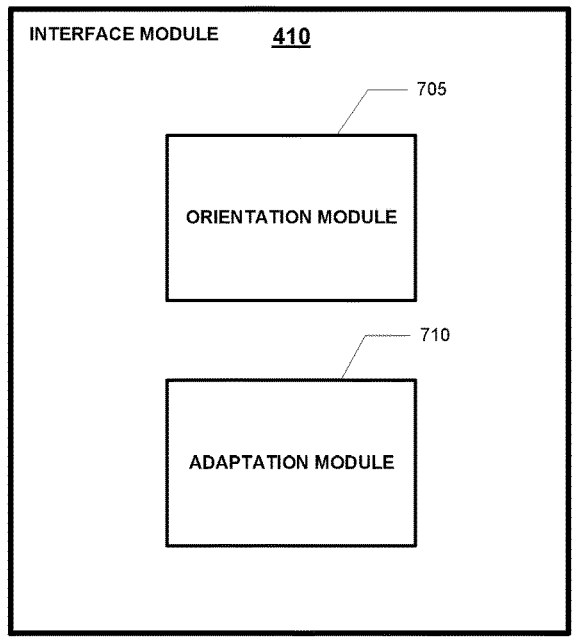
FIG. 8 illustrates an example interface module structured in accordance with some embodiments discussed herein.

In some embodiments the interface module 410 may include an orientation module 705 and an adaptation module 710 (as shown in FIG. 8). Wearable device 100 may consist of circuitry 400. The orientation module 705 and adaptation module 710 of interface module 410 may interact with interactive display 101 using input/output module 408, and other components of circuitry 400.

Figure 6:
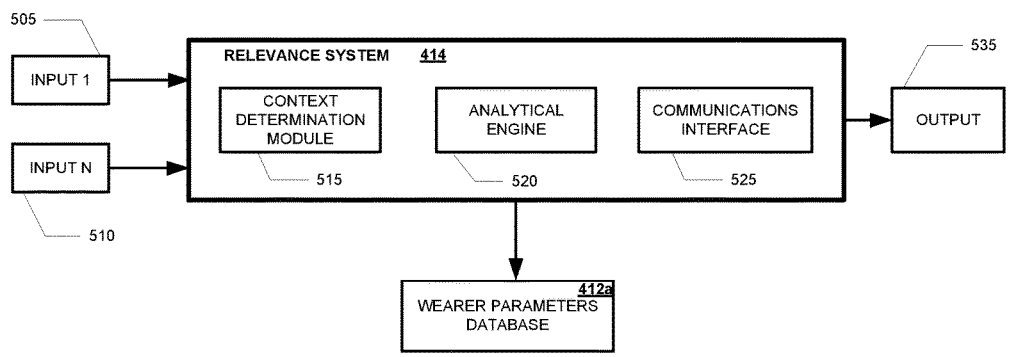
FIG. 6 illustrates an example of a relevance system structured in accordance with some embodiments discussed herein.

FIG. 6 shows an illustrative schematic diagram of relevance system 414. Relevance system 414 may be used to calculate the relevancy score for items, the wearer components, and/or the redemption components displayed on interactive display 101. Relevance system 414 may receive a plurality of inputs 505, 510 from the circuitry 400 and process the inputs within the relevance system to produce a relevance output 535, which may include a relevancy score. In some embodiments, the relevance system 414 may execute context determination 515, process the data in an analytical engine 520, and output the results via a communications interface 525. Each of these steps may pull data from a plurality of sources including the wearer parameters database 412a.

When inputs 505, 510 are received by the relevance system 414, a context determination 515 may first be made. A context determination includes such information as a wearer and/or merchant preference data, what item or user are the items being compared to for the relevancy scoring, and under what circumstances has the interface or system has requested the relevancy information. These inputs may give context to the relevance system's 414 analysis to determine to what reference source the relevancy score is based. For example, the context determination module 515 may instruct the relevance system to calculate relevancy scores based on a specific user (e.g. a specific wearer or specific merchant). In some embodiments, the context determination module 515 may instruct the relevance system to calculate relevancy scores for wearer components or redemption components based on data for a specific location or environment. The context determination module 515 may select any criteria based on any number of preferences and automatic determinations around which to calculate the relevancy scores. In one embodiment, the relevance system may calculate relevancy scores of suggested promotion offers (i.e. wearer component) to present to the user based on inputs from the wearer parameters database. Using promotional offers for restaurants as an example, inputs may include the wearer's food type preference (i.e. preference data), wearer's age (i.e. biographical data), and a wearer's past food purchases (i.e. transaction data). Based on this information, the relevance system can generate a relevancy score for suggestion promotion offers for restaurant 1, which is an expensive Italian restaurant, restaurant 2, which is a cheap Mexican restaurant 3, which is an expensive Mexican restaurant, restaurant 4, which is a cheap Italian restaurant. A first user may prefer Italian food, be 35 years old, and has eaten at very expensive restaurants. As a result, a promotional offer to restaurant 1 may be given the highest relevancy score, as restaurant 1 closely matches the user's information. Restaurant 3, may be given the second highest relevancy score, because of the user's past food purchases and his age. As a result of the relevancy score, a suggested promotion for restaurant 1 may be initially presented to the user's wearable device. If the user indicates that he is not interested in the promotion for restaurant 1, then the promotion for restaurant 2 may be presented. In another example a second user may prefer Japanese food, be 19 years old, and eats at cheap restaurants. As a result, a promotion offer to restaurant 3 may be given the highest relevancy score, because it matches the user's transaction data and the promotion related to restaurant 3 is more than the promotion related to restaurant 4. Restaurant 4 would receive the second highest relevancy score, because it matches the user's transaction data. As can be seen the relevancy system may take into account not only the redeeming establishment of the suggested promotional offer, but also the suggested promotional offer itself. The relevance system 414 may then compute the relevancy scores using the analytical engine 520. The analytical engine 520 draws information about the profile and the items from the wearer parameters database 412a and then, in light of the context determination module's 515 determination, computes a relevancy score for each of the items. The analytical engine 520, in some embodiments, may produce a hierarchy of relevancy scores for the items based on the similarities between a given item, or profile data, and each of the plurality of items. The analytical engine 520 may compare each item with the desired context 515 to determine the relevancy scores. The communications interface 525 then outputs 535 the relevancy scores to the interface module 410 on a local or remote circuitry 400 for use in generating an interface for wearable device 100. Although FIG. 6 is illustrated with wearer parameters database 412a is it within the scope of the invention to calculate relevancy scores using information from merchant redemption parameters database 412b.

Additional descriptions of relevance determination algorithms for identifying promotions relevant to a consumer or other profile data that may be used alternatively or additionally are described in U.S. patent application Ser. No. 13/411,502, filed Mar. 2, 2012, titled "RELEVANCE SYSTEM FOR CONSUMER DEALS", U.S. patent application Ser. No. 13/829,581 entitled "PROMOTION OFFERING SYSTEM" filed on Mar. 14, 2013, and U.S. patent application Ser. No. 12/776,028, now U.S. Pat. No. 8,355,948, titled "SYSTEM AND METHODS FOR DISCOUNT RETAILING" filed on May 7, 2010, the entirety of each is incorporated by reference herein.

In some embodiments, consumer device 302 or wearable device 100 may receive or access a profile identifier. The profile identifier may be received remotely, via wireless communication or tethered communication, or directly, via input into one of the devices 302 and 100. For example, in some embodiments, the wearer may utilize wearable device 100 to interact with the consumer device 302 to transmit a profile identifier and other related profile data. In another example, a wearer may simply provide login credentials through the interface of their wearable device. The devices 302 and 100 may receive the profile identifier and transfer it to the circuitry 400. The circuitry 400 may then access the wearer parameter database 412a and or merchant redemption parameters database 412b to retrieve profile data 610 associated with the profile identifier and transfer the profile identifier and/or the profile data to the relevance system 414 and/or the interface module 410.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of a local or networked system and/or circuitry 400. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program goods. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 402, interface module 410, and/or relevance system 414 discussed above with reference to FIG. 4, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 404) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Exemplary Operation

Figure 9:
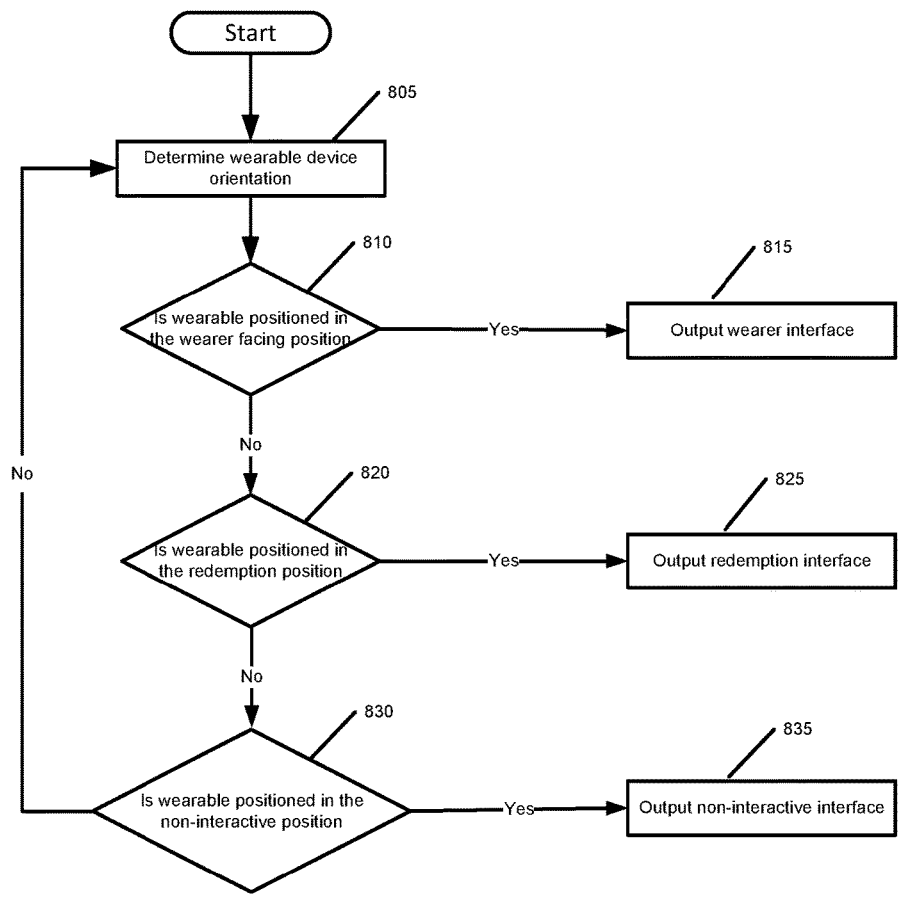
FIG. 9 illustrates a flow diagram of an example orientation determination process performed at least by an orientation module structured in accordance with some embodiments discussed herein.

FIG. 9 illustrates an exemplary operation method of a wearable device. At step 805, the orientation module of the wearable device determines the orientation of the wearable device. The orientation module may use various techniques to determine the orientation of the wearable device, including obtaining data from: an accelerometer, a camera, voice sensors, audio sensors, a gyroscope, neural networks, and the like. The aforementioned sources of data may be stored to a database asset of the network or stored to the memory of the wearable device itself or a consumer device (e.g., a mobile phone) coupled (wired or wirelessly) to the wearable device (e.g., through a local area network). In one embodiment, the orientation module may receive, via an input/output module, accelerometer data from the wearable device and based on such data may determine the orientation of the wearable device. In another example, the orientation module may receive data output by a camera (e.g., a picture, light versus dark contrast data, etc.) or other sensor of the wearable device. In another embodiment, the orientation module may receive, via an input/output module, gyroscope data from the wearable device and based on such data may determine the orientation of the wearable device.

The accelerometer and/or other wearable device sensor data may be used as clustered or the non-clustered attributes to train a machine learning model (e.g., an artificial neural network model). It should be understood that the selection of attributes or clusters of attributes for training machine learning models or for wearable device position determination by the orientation module can affect the respective performance. In some implementations, attributes and/or clusters of attributes are selected based on statistical analysis. In some implementations, selection of the most significant attributes is based on one or more different attribute selection approaches. These approaches may be (1) forward selection, which is starting with the most significant attributes and incrementally adding a next significant attribute until the model is stable; (2) backward elimination, which starts with all the attributes and exclude the non-significant attributes one by one until the model is stable; (3) a combination of forward selection and backward elimination; and (4) checking the significance of the attribute by statistical model (regression). In one embodiment, each attribute selection approach may give a subset of significant attributes. The attributes that are not shown to be significant by one or more of the attribute selection approaches may be excluded from the model.

In some embodiments, the orientation module wearable device position determination process is performed by an artificial neural network model. However, in other embodiments, the orientation module may use other machine learning models including, Naïve Bayes, logistic regression, decision tree learning, and the like.

The orientation module can determine the orientation of the wearable device in relation to the wearer or a third party. For example, using an data from an accelerometer (or other described sources) the orientation module may detect if the wearable is orientated at, approximately at, relatively close to, or exactly at: the wearer's side (e.g. with the wearer's arms straight down), the wearer's midsection, the wearer's mouth, the wearer's face, on the wearer's head, extended from the wearer's body, a third party's side, a third party's midsection, a third party's mouth, a third party's face, extended towards a third party and the like. In order to determine the plurality of positions detailed above, the orientation module may receive information from a gyroscope, Z-axis data from a GPS, and the like. In one embodiment, the wearable device will have an initial set up routine to take initial measurements of the accelerometer, gyroscope, GPS, and the like, such that changes in data output by these devices may be accurately detected. In another embodiment, the user may be able to indicate and customize one or more plurality of positions. For example, the user may position the wearable device at his side and say "orientation: side" and processor of the wearable device may receive information from accelerometer, gyroscope, and/or GPS data and the like, to indicate the received information is indicative of a side orientation. In another embodiment, the user trains the orientation module during an initial set up routine by validating each of the various positions with a gesture. For example, the user positions the wearable device in the wearer facing position and twists his wrists, as confirmation that the wearable device is in the wearer facing position. Next, the user positions the wearable device in the redemption position and wiggles wrist, as confirmation that the wearable device is in the redemption position. Next, the user positions the wearable device in the non-interactive position and twists his wrist, as confirmation that the wearable device is in the non-interactive position. By using any of the methods r processes stated herein or similar methods or processes the orientation module may determine if the wearable device is in a wearer facing position (e.g. when the interactive display of the wearable device is facing the wearer) or in a redemption position (e.g., when the interactive display of the wearable device is facing a merchant, another person, a point of sale device, and the like).

At step 810, if the orientation module determines that the wearable device is oriented in a wearer facing position then the adaptation module of the wearable device outputs a wearer interface to the interactive display of the wearable device (step 815). The wearer interface may contain one or more wearer components as illustrated in FIG. 1.

The wearer interface is automatically tailored to the wearer using relevance system 414 and/or wearer parameters database 412*a*. In one embodiment, adaptation module of wearable device accesses wearer parameters database 412*a* to obtain profile data of the wearer. Profile data may contain various transaction data, biographical data and preference data associate with the wearer. Using the wearer's profile data, the adaptation module may modify the wearer interface. For example, if biographical data indicates that the wearer of the wearable device is a young child the wearer interface might be displayed, via the interactive display, in bright vibrant colors. Furthermore, using the wearer's profile data, the adaptation module may include various wearer components. For, if the transactional data indicates that the wearer of the wearable device frequently utilizes a particular payment method (e.g. a credit card) then the wearer interface may include the payment method as a wearer component (see FIG. 1).

At step 810, if the orientation module determined that the wearable device is not orientated in the wearer facing position then at step 820, the orientation module determines if the wearable device is orientated in a redemption position. If the wearable device is oriented in the redemption position, at step 825, the adaptation module of the wearable device outputs a redemption interface to the interactive display of the wearable device. The redemption interface contains one or more redemption components. A provider may use one or redemption components to facilitate redemption of a promotion.

The redemption interface is automatically tailored to the provider using relevance system 414 and/or merchant redemption parameters database 412b. In one embodiment, adaptation module of wearable device accesses merchant redemption parameters database 412b to obtain profile data of the provider. Profile data may contain various transaction data, and preference data associate with the provider. Using the profile data the adaptation module modifies the redemption interface. For example, if transaction data indicates that the provider has only accepted quick response codes for his last ten orders then a redemption code may, by default, be displayed as a quick response code.

At step 820, if it is determined by the orientation module that the wearable device is not orientated in a redemption position then the process returns to step then at step 830, the orientation module determines if the wearable device is oriented in a non-interactive position. If the wearable device is oriented in the non-interactive position, at step 835, the adaptation module of the wearable device outputs a non-interactive interface. For example, the non-interactive interface may display a simple black screen to converse power and keep an unintended user from viewing sensitive information. In another example, the non-interactive interface may display a digital clock. In an alternate embodiment, the orientation module determines if the wearable device is oriented in a plurality of distinct positions and the adaptation module output interfaces corresponding to the detected positions. For example, the orientation module may detect that the wearable device is orientated above the wearer and the adaptation module may output a corresponding interface. Any combination of orientation determination and interface output may be utilized such that different wearable device orientations correspond to different interfaces.

Figure 11:
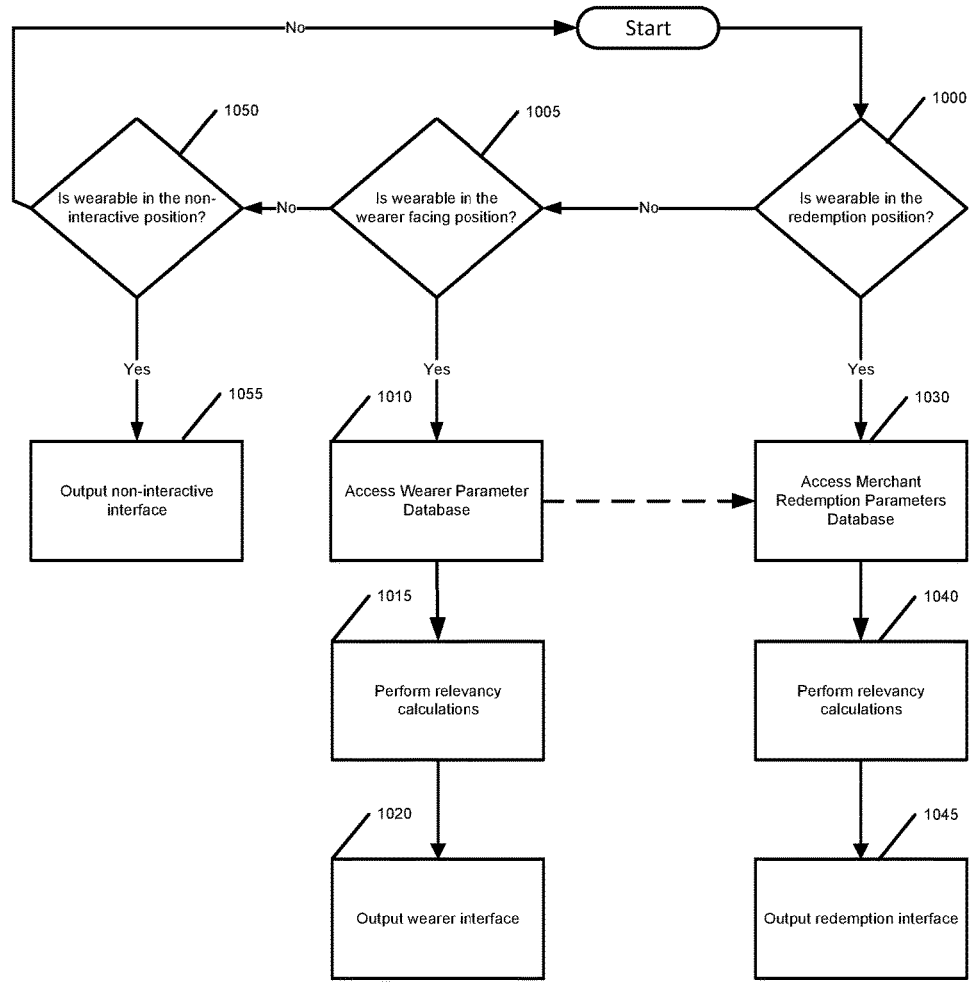
FIG. 11 illustrates a flow diagram of an example interface determination process performed at least by an orientation module and relevancy system structured in accordance with some embodiments discussed herein.

As illustrated in FIG. 11, there may be separate databases and/or relevancy systems for the wearer and the provider. At step 1000, it is determined by the orientation module if the wearable device is in the redemption position. If not at, at step 1005 it is determined by the orientation module if the wearable device is in the wearer facing position. If the wearable device is in the wearer facing position the process moves to step 1010. At step 1010, the adaptation module accesses the wearer parameters database. As previously discussed, and with reference to FIGS. 6-7, the wearer parameters database contains data corresponding to the wearer (i.e. FIG. 7A.) Optionally, the adaption module may also access the merchant redemption parameters database. Utilizing both the merchant redemption parameters database and wearer parameters database the adaptation module may produce both wearer components and redemption components in the wearer interface.

For example, when the wearable is oriented in a wearer facing position, wearer interface may include a wearer component such as a customer ID and a redemption component such as a QR code. In another embodiment, while in the redemption position, the adaptation module does not access the wearer parameters database, which prevents a merchant from accidently or purposefully viewing wearer components (e.g., personal information of the wearer and alternate application data). At step 1015, a relevance system, using the wearer parameters database, calculates relevancy scores for wearer components potentially output in the wearer interface. The calculated relevancy scores may determine which components and what form the components take when the wearable device is in the wearer facing position (step 1020). For example, if the wearer parameters database of indicates that the wearer frequently buys concert tickets, the relevance system may give a high relevance score to promotional items having to do with similar concerts, and using the relevancy score, the adaptation module may produce promotions relevant to various similar concerts in the "suggested promotions" portion of the wearer interface (see FIG. 1). In another example, if the wearer parameters database indicates that the wearer frequently uses a particular credit card for purchases, the relevance system may give a high relevance score to that particular credit card as a form of payment in lieu of other forms of payment, and the adaptation module may produce that particular credit card as a default form of payment in the wearer interface (see FIG. 1).

If at step 1000, the orientation module determines that the wearable is in the redemption position then at step 1030 the adaptation module accesses the merchant redemption parameters database. As previously discussed, and with reference to FIGS. 6-7B, the merchant redemption parameters database contains information corresponding to the merchant. At step 1040, a relevance system accesses the merchant redemption parameters database and calculates relevancy scores for components potentially output in the redemption interface. The calculated relevancy score may determine which components and what form the components take when the wearable device in the redemption position (step 1045). For example, if the merchant redemption parameters database indicates that the merchant frequently accepts codes in a barcode format, the relevance system may give a high relevance score to the barcode format in lieu of other code formats, and using the relevancy score, the adaptation module, may produce a redemption code as a barcode in the redemption interface. In another example, if merchant redemption parameters database indicates that the merchant is not capable of accepting a particular type of code (e.g. cannot accept quick response code), the relevance system may give a low relevance score to quick response codes as a redemption component, and using the relevancy score, the adaptation module, may produce another redemption code format (e.g. a random number) as a default form of the redemption component in the redemption interface.

If at step 1005, the orientation module determines that the wearable is not in the wearer facing position then at step 1050, the orientation module determines if the wearable is in the non-interactive position. If the wearable is in the non-interactive position then, at step 1055, an output non-interactive interface is output by the adaptation module to the display of the wearable device. Although not depicted, in some embodiments there may be an internal or external (to the wearable device) non-interactive database. Similar to the wearer and merchant databases described above, the non-interactive database may comprise profile data that contains transaction data, biographical data, and preference data related to the user. The data in the non-interactive database may be used to customize the display of the wearable in the non-interactive position. For example, if biographical data indicates a youthful user (i.e. 14 and younger) the display may display a cartoon styled watch, and if the biographical data indicates an older user (i.e. 50 and above) the display may display a Rolex-like watch. Furthermore, preference data may indicate the user's power consumption, connectivity options, and the like. For example, the user may wish to disable GPS and Bluetooth when in the non-interactive position.

While FIG. 11 only illustrates three positions of the wearable device it is within the scope of the invention to access different databases when the orientation of a wearable device is determined to be in different positions.

Figure 10:
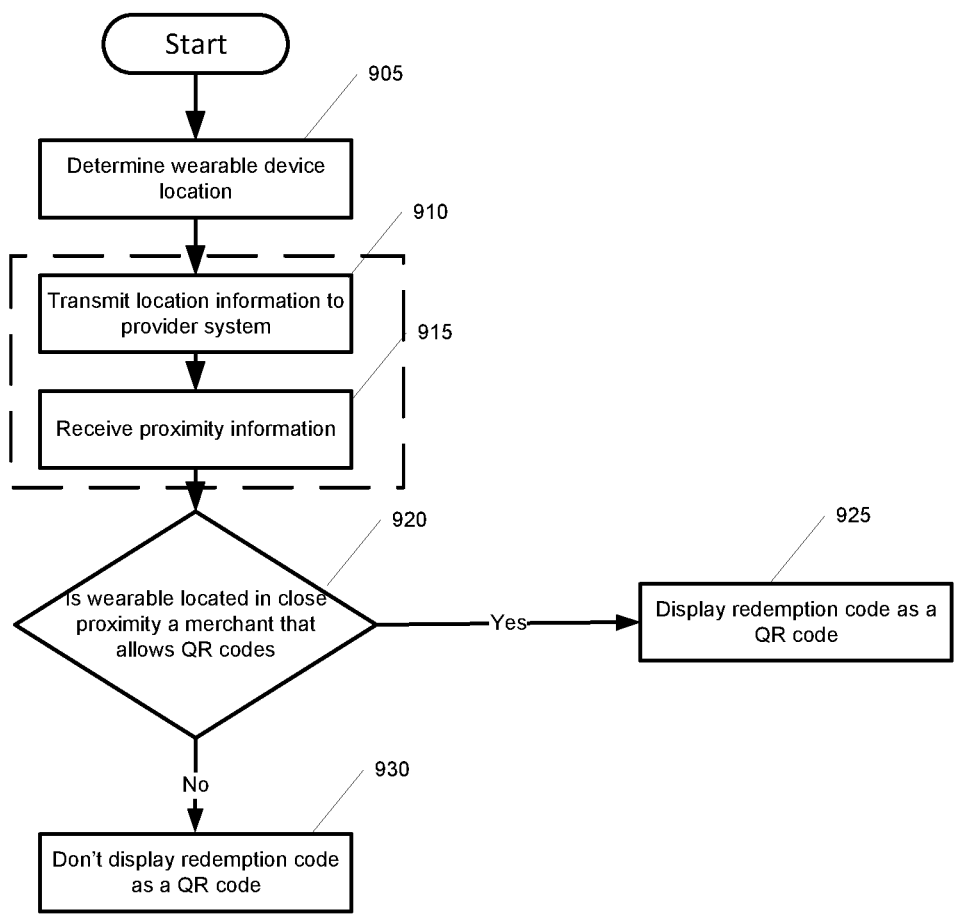
FIG. 10 illustrates a flow diagram of an example location determination process performed at least by a processor structured in accordance with some embodiments discussed herein.

FIG. 10 illustrates an exemplary process for determining information displayed on the wearable device using location information. At step 905, the location of a wearable device is determined by a processor of the wearable device. The process may determine location of the wearable device by any known means, for example, using software and/or hardware of the wearable device or a coupled consumer device (e.g. by using global position system (GPS), location applications (e.g. Google™ Maps), subscriber identification modules, and the like), network-based techniques (e.g. network triangulation, Bluetooth/iBeacons, and the like), access-point based techniques (e.g. WiFi positioning systems), or any combination of aforementioned methods.

At steps 910 and 915, after the location of the wearable device is determined the location determination may optionally be transmitted and received by the provider system. In an alternate embodiment, the location determination may be transmitted and received by a promotion and marketing service. At step 920, the provider system compares the received location determination, to stored location information relating to providers to determine and make a proximity determination. Alternatively, steps 910 and 915 may be omitted and the wearable device, consumer device, or other local device may perform the proximity determination. The proximity determination at step 920 may be calculated by comparing the known location of merchants that accept quick response codes to the location of the wearable device. At step 925, if the wearable device is located in close proximity to a merchant that accepts quick response code redemption, the adaptation module may output a redemption component in quick response code format. Close proximity may be defined on a per application basis, and may be for example, less than 1000 feet, less than 100 feet, less than 1 mile, less than one inch, and the like. At step 930, if the wearable device is located in close proximity to a merchant who does not accept quick response codes, the adaptation module may output the redemption code in another format (e.g. barcode or random number). In some embodiments, the redemption code may be output in a human-readable format (e.g. alphanumeric or passphrase).

While FIG. 10 only depicts determining the type of redemption code displayed it is fully within the scope of the invention to use location information and/or a proximity determination to modify any information displayed on the wearable device. For example, a proximity determination may be used to determine the wearable device's proximity to a stadium, and the adaptation module may output a wearer interface that contains certain promotion deals associated with that stadium (e.g. concerts or sporting events). It is also fully within the scope of the invention to use various other means to determine the wearable device's proximity to a merchant, for example, Bluetooth, WiFi systems, Near Field Communication (NFC), Infrared Communication (IR), and the like. In another example, a proximity determination may be used to determine if the location of the wearable is in close proximity to any merchant. If not in close proximity, the wearable device may not present the redemption interface when positioned in the redemption position. In such an instance, the user may use other means to display the redemption interface, such as pushing a redemption soft key and moving the device to the redemption position to generate the redemption interface. This embodiment may act as a security feature to prevent an unintentional display of information.

Figure 12:
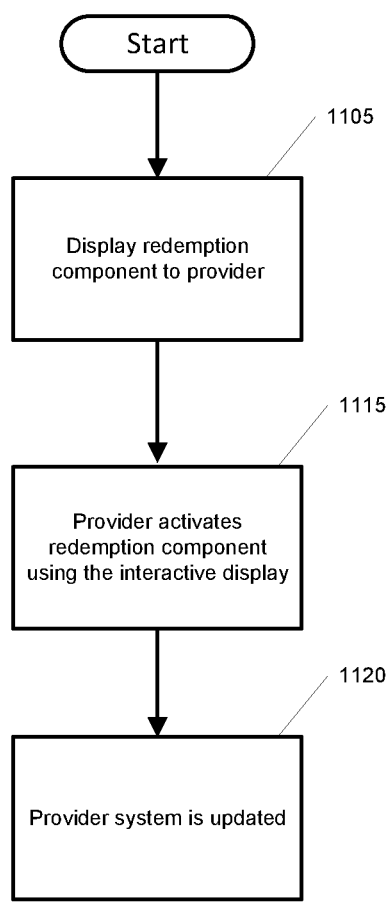
FIG. 12 illustrates a flow diagram of an example redemption process performed by at least an interactive interface structured in accordance with some embodiments discussed herein.

FIG. 12 illustrates an exemplary process of presenting and activating a redemption code. At step 1105, the wearable device, via an interactive interface, displays a redemption code to a provider. While not shown, prior to step 1105, the wearer or the provider may enter information into the wearable device to identify the provider corresponding to the redemption code. For example, the wearer of the wearable device may enter a merchant identification via the interactive display of the wearable device, and in response the wearable device may present redemption codes associated with that provider. In another embodiment, the merchant identification may automatically be detected using the relevance system, merchant redemption parameters database, location information, proximity information, and the like. For example, the wearable device may automatically determine provider identity based on GPS data corresponding to the wearable device, and in response the wearable device may present associated redemption codes. The displayed redemption code at step 1105 may take many forms as discussed herein.

At step 1115, the provider activates the redemption code using the interactive display of the wearable device. The provider may activate the redemption code by various known means including, for example, touching the interactive display, scanning the interactive display, speaking to the interactive display, and the like. In another embodiment, the wearer activates the redemption code by the aforementioned methods. After the redemption code is activated the wearer may receive the item related to the redemption code. For example, if the redemption code is a QR code for admission to concert, then upon successfully activating the QR code the wearer may be allowed into the concert.

At step 1120, after the redemption code has been activated, the provider system is updated to indicate that the wearer of the wearable device has redeemed the redemption code. The indication of redemption may also be transmitted to the wearer parameters database, promotion and marketing service system, consumer device and/or the merchant redemption parameters database. In other embodiments, the provider system or the promotion and marketing service system may authenticate the redemption code prior to activation of the redemption code.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A wearable device that is movable between a wearer facing position and a redemption position, the wearable device comprising at least a processor and a memory associated with the processor having computer coded instructions therein, the wearable device further comprising:
   an interactive display;
   an orientation module coupled with the processor, the
      orientation module configured to determine whether the wearable device is oriented in the wearer facing position or the redemption position; and an adaptation module coupled with the processor, the adaptation module configured to:
output a wearer interface to the interactive display when the orientation module determines the wearable device is oriented in the wearer facing position, and when the orientation module determines the wearable device is oriented in the redemption position:
determine a geographic location associated with the wearable device,
access a merchant redemption parameters database to determine a redemption components set based on the geographic location,
calculate relevancy scores for each redemption component of the redemption components set,
determine a selected redemption component from the redemption components set based on the relevancy scores, and
output a redemption interface to the interactive display, the redemption interface comprising the selected redemption component.

2. The wearable device of claim 1, wherein the wearer interface comprises a wearer component.

3. The wearable device of claim 1, wherein the redemption component is rendered by the interactive display as at least one of a quick response code, a barcode, or an alphanumeric code.

4. The wearable device of claim 2, wherein the adaptation module is configured to determine the wearer component by accessing wearer information stored in a wearer parameters database.

5. The wearable device of claim 4, wherein the wearer component comprises personally identifiable information.

6. The wearable device of claim 4, wherein the wearer component comprises transaction data.

7. The wearable device of claim 4, wherein the wearer component comprises alternate application data.

8. The wearable device of claim 1, wherein the orientation module is configured to receive accelerometer data associated with the wearable device, and wherein the orientation module is further configured to determine whether the wearable device is oriented in the wearer facing position or the redemption position based on the accelerometer data.

9. The wearable device of claim 1, wherein the orientation module is configured to receive camera data associated with the wearable device, and wherein the orientation module is further configured to determine whether the wearable device is oriented in the wearer facing position or the redemption position based on the camera data.

10. The wearable device of claim 1, wherein the orientation module is configured to receive audio data associated with the wearable device, and wherein the orientation module is further configured to determine whether the wearable device is oriented in the wearer facing position or the redemption position based on the audio data.

11. The wearable device of claim 1, wherein the orientation module is configured to receive neural network model data associated with the wearable device, and wherein the orientation module is further configured to determine whether the wearable device is oriented in the wearer facing position or the redemption position based on the neural network model data.

12. A method for presenting one or more interfaces on a wearable device, the method comprising:

determining, by a processor, whether the wearable device is oriented in a wearer facing position or a redemption position;

outputting, via an adaptation module coupled to the processor, a wearer interface to an interactive display when the processor determines the wearable device is oriented in the wearer facing position;

when the processor determined the wearable device is positioned in the redemption position:
determining, via the adaptation module coupled to the processor, a geographic location associated with wearable device,
accessing, via the adaptation module coupled to the processor, a merchant redemption parameters database to determine a redemption components set based on the geographic location,
calculating, via the adaptation module coupled to the processor, relevancy scores for each redemption component of the redemption components set,
determining, via the adaptation module coupled to the processor, a selected redemption component from the redemption components set based on the relevancy scores,
outputting, via the adaptation module coupled to the processor, a redemption interface to the interactive display, the redemption interface comprising the selected redemption component; and presenting, using the interactive display, the wearer interface or the redemption interface.

13. The method of claim 12, wherein the wearer interface comprises a wearer component.

14. The method of claim 11, further comprising rendering, via the interactive display, the redemption component as at least one of a quick response code, barcode, or an alphanumeric code.

15. The method of claim 13, further comprising accessing, via the adaptation module a wearer parameters database, and determining, via the adaptation module, the wearer component from information stored on the wearer parameters database.

16. The method of claim 15, wherein the wearer component comprises personally identifiable information.

17. The method of claim 15, wherein the wearer component comprises transaction data.

18. The method of claim 15, wherein the wearer component comprises alternate application data.

19. The method of claim 12, further comprising receiving, via the orientation module, camera data associated with the wearable device, and determining, via the orientation module, whether the wearable device is oriented in the wearer facing position or the redemption position based on the camera data.

20. The method of claim 12, further comprising receiving, via the orientation module, audio data associated with the wearable device, and determining, via the orientation module, whether the wearable device is oriented in the wearer facing position or the redemption position based on the audio data.

21. The method of claim 12, further comprising receiving, via the orientation module, neural network model data associated with the wearable device, and determining, via the orientation module, whether the wearable device is oriented in the wearer facing position or the redemption position based on the neural network model data.

22. The method of claim 12, further comprising receiving, via the orientation module, accelerometer data associated with the wearable device, and determining, via the orientation module, whether the wearable device is oriented in the wearer facing position or the redemption position based on the accelerometer data.

23. A computer program product comprising non-transitory computer readable storage medium and computer program instructions stored therein, the computer program instructions comprising program instructions configured to:
determine, via an orientation module, an orientation of a wearable device;
determine, via the orientation module, whether the wearable device is oriented in a wearer facing position or a redemption position;
output, via an adaptation module, a wearer interface to an interactive display when the orientation module determines the wearable device is oriented in the wearer facing position, and render, via the interactive display, the wearer interface;
when the orientation module determines the wearable device is oriented in the redemption position;
determine, via the adaptation module, a geographic location associated with the wearable device,
access, via the adaptation module, a merchant redemption parameters database to determine a redemption components set based on the geographic location,
calculate, via the adaptation module, relevancy scores for each redemption component of the redemption components set,
determine, via the adaptation module, a selected redemption component from the redemption components set based on the relevancy scores, and
output, via the adaptation module, a redemption interface to the interactive display, the redemption interface comprising the selected redemption component, and render, via the interactive display, the redemption interface.

24. The computer program product of claim 23, wherein the wearer interface comprises a wearer component.

25. The computer program product of claim 23, further configured to render, via the interactive display, the redemption component as at least one of a quick response code, a barcode, or an alphanumeric code.

26. The computer program product of claim 24, further configured to access, via the adaptation module, a wearer parameters database, and determine, via the adaptation module, the wearer component from information stored on the wearer parameters database.

27. The computer program product of claim 26, wherein the wearer component comprises personally identifiable information.

28. The computer program product of claim 26, wherein the wearer component comprises transaction data.

29. The computer program product of claim 26, wherein the wearer component comprises alternate application data.

30. The computer program product of claim 23, further configured to receive, via the orientation module, camera data associated with the wearable device, and determine, via the orientation module, whether the wearable device is oriented in the wearer facing position or the redemption position based on the camera data.

31. The computer program product of claim 23, further configured to receive, via the orientation module, audio data associated with the wearable device, and determine, via the orientation module, whether the wearable device is oriented in the wearer facing position or the redemption position based on the audio data.

32. The computer program product of claim 23, further configured to receive, via the orientation module, neural network model data associated with the wearable device, and determine, via the orientation module, whether the wearable device is oriented in the wearer facing position or the redemption position based on the neural network model data.

33. The computer program product of claim 23, further configured to receive, via the orientation module, accelerometer data associated with the wearable device, and determine, via the orientation module, whether the wearable device is oriented in the wearer facing position or the redemption position based on the accelerometer data.

34. The wearable device of claim 1, wherein the orientation module is further configured to determine whether the wearable device is oriented in a non-interactive position; and the adaptation module is further configured to output a non-interactive interface to the interactive display when the orientation module determines the wearable device is oriented in the non-interactive position.

35. The method of claim 12, further comprising determining, via the orientation module, whether the wearable device is oriented in an non-interactive position; output, via an adaptation module, a non-interactive interface to the interactive display when the orientation module determines the wearable device is oriented in the non-interactive position.

36. The computer program product of claim 23, further configured to determine, via the orientation module, whether the wearable device is oriented in an non-interactive position; output, via an adaptation module, a non-interactive interface to the interactive display when the orientation module determines the wearable device is oriented in the non-interactive position.

* * * * *

UNITED STATES PATENT AND TRADEMARK OFFICE
CERTIFICATE OF CORRECTION

PATENT NO. : 10,126,837 B1
APPLICATION NO. : 15/197202
DATED : November 13, 2018
INVENTOR(S) : Bergstrom et al.

Page 1 of 1

It is certified that error appears in the above-identified patent and that said Letters Patent is hereby corrected as shown below:

In the Claims

Column 23,
Line 8, Please delete "and".

Column 25,
Line 19, "redemption position;" should read --redemption position:--.

Signed and Sealed this
Seventh Day of May, 2019

Andrei Iancu
*Director of the United States Patent and Trademark Office*